United States Patent Office 3,459,950
Patented Aug. 5, 1969

3,459,950
APPARATUS FOR A STOPPAGE-FREE PROCESS-
ING OF WEBS OR FOR A STOPPAGE-FREE
PROCESSING OR HANDLING OF WORKPIECES
Horst Schneider, Lengerich, Germany, assignor to
Windmöller & Hölscher
Filed July 24, 1964, Ser. No. 384,938
Claims priority, application Germany, June 2, 1964,
W 36,909
Int. Cl. H01j 39/12; G06m 7/00
U.S. Cl. 250—223                                    4 Claims

ABSTRACT OF THE DISCLOSURE

An apparatus for a stoppage-free processing of webs in adjustable processing stations or for a stoppage-free processing or handling of workpieces, which are set in variable lengths or with variable spacings. The apparatus comprises at least two conveyor elements arranged parallel to one another and means driving said elements at different speeds in such a manner that the conveyor elements are driven at an increased follow-up speed after completing the processing or handling operation performed by the respective tool and are retarded to the speed of the web or workpieces when the tool has the desired spacing from the tool of the respective other conveyor element.

---

Figure 1:
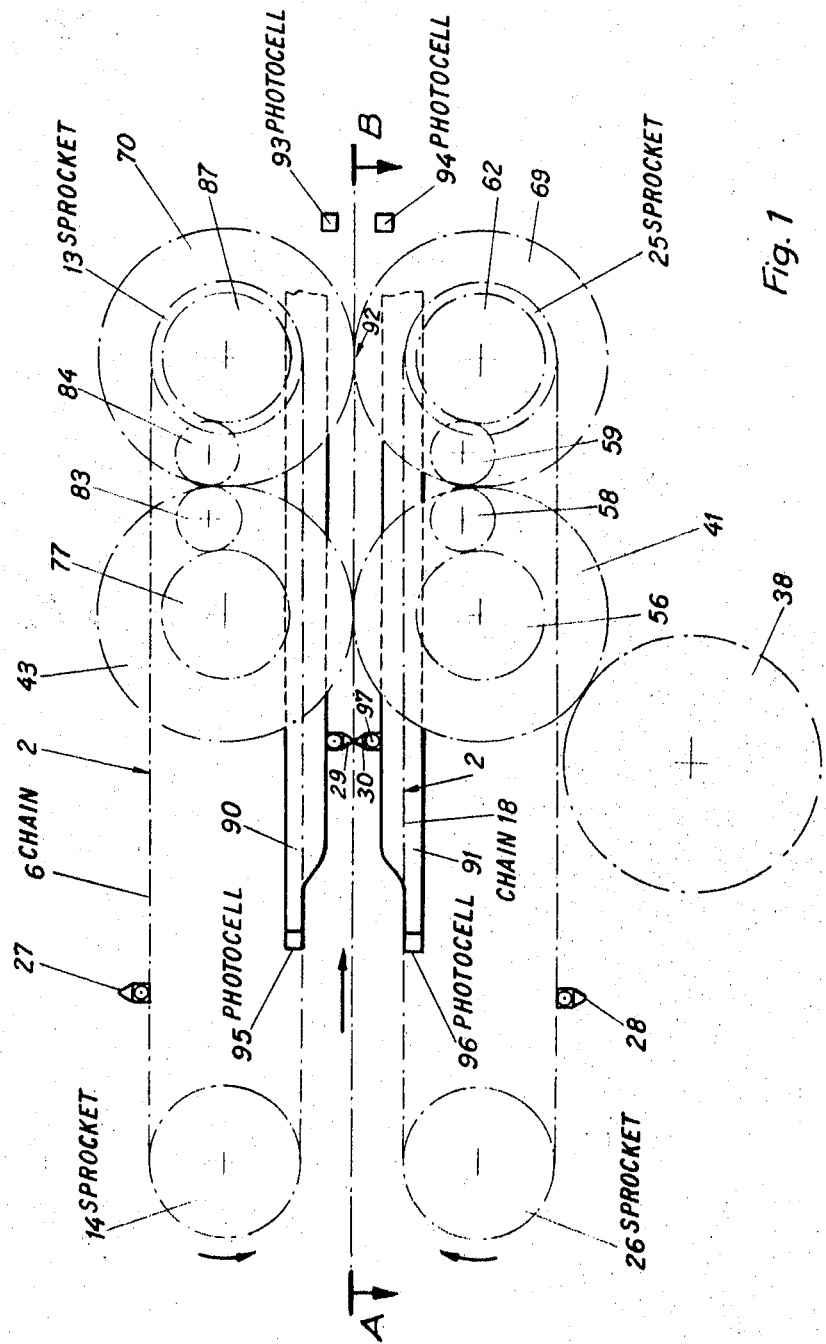

This invention relates to an apparatus for a stoppage free processing of webs in adjustable processing stations or for a stoppage-free processing or handling of workpieces, which are fed in variable lengths or with a variable spacing, which apparatus comprises processing or handling tools, which are secured to revolving endless conveyor elements, preferably conveyor chains, and move during the processing or handling operation at the speed of the web or workpieces. In known apparatus of this kind, e.g., welding apparatus for bag- or sack-making machines for making bags or sacks of thermoplastic material, which apparatus is designed to form seam welds extending transversely to the feeding direction of a tubing fed in flat condition, or conveyor chains having grippers, e.g., for sack workpieces, each conveyor chain comprises a plurality of processing or handling tools, which are spaced longitudinally of the conveyor chain as is required for processing or handling operations. The conveyor chains revolve always at the feeding speed of the web or workpieces. These known apparatus have the great disadvantage that a change of the apparatus to a different spacing of the processing or handling operations will increase or decrease the number of tools arranged with the new spacing on the conveyor elements or a decrease or increase of the length of the conveyor chains with the aid of plug links or extension members, accompanied by a change in the position of the sprockets so that the shortened or extended chains are tensioned. Thus, the change to another spacing between the processing or handling operations requires much time and results in an undesirably long interruption of production. Besides, a very large number of tools are required for the manufacture of relatively small articles with the aid of long chains in the known apparatus. For these reasons, the known apparatus for a continuous formation of seam welds has not been successful and the usual welding apparatus still operates intermittently, each welding period being succeeded by a feeding period. The output of such machines is limited because these feeding periods cannot be used for welding. In the intermittently operating welding apparatus, the feeding of the web is interrupted during the welding operation so that it is difficult or impossible to incorporate such intermittently operating machines in a production line or to couple them, e.g., to a continuously operable extruder or printing machine.

It is an object of the invention to provide apparatus which is suitable for the purpose stated first hereinbefore and which is free of the disadvantages both of the continuously operating apparatus and of the intermittent apparatus. Hence, the invention teaches essentially to revolve the two continuously operating tools in dependently of each other in such a manner that the tool which is free at a time is caused to follow up at a higher speed the tool which is in working position and moves at the speed of the web or workpieces, and that the speed of the free tool is changed to the working speed when said free tool is at the desired distance behind the other tool. The spacing of the processing or handling operations can be changed in a very simple manner, without need for difficult and time-consuming re-equipping operations, by a corresponding change of the length of the path in which the tools revolve at an increased speed, or by a change in the follow-up speed.

In a development of the invention, the drive linkage between the drive motor and the drive wheels of cooperating conveyor elements may be branched and both branches may have different transmission ratios and be adapted to be selectively coupled to the shafts of the drive wheels. Hence, one and the same motor is used for driving the conveyor elements, preferably conveyor chains, which carry the tools, at the working speed and at the follow-up speed, and two transmission lines, which become alternatingly effective, are arranged between this motor and the shafts of the drive wheels and transmit the drive power of the motor at different speeds to the drive shafts. It is particularly suitable to provide a freewheel clutch for connecting the slower transmission line and an externally controlled clutch for coupling the faster transmission line to the shafts of the drive wheels.

In a particularly suitable embodiment of the invention, the externally controlled clutches are adapted to be controlled by photoelectric cells, which are disposed at an adjustable distance from each other at the entrance and exit of the working path of the tools. In this embodiment, the distance between the photoelectric cells determines the spacing of the processing operations, e.g., the length or width of the bags or sacks to be made in the formation of transverse seam welds on continuously moved tubing. The externally controlled clutches may suitably consist of electromagnetic clutches, and electromagnetic brakes acting on the shafts of the drive wheels may be provided to ensure a retardation of the tools to the working speed within the shortest time possible after the disengagement of the electromagnetic clutches. The above-mentioned control by photoelectric cells may be replaced by a control effected by electronic length measuring mechanisms.

Further features of the invention will be explained in more detail in the following description with reference to the drawing, which shows by way of example an embodiment of the invention as applied to a welding apparatus for forming transverse seam welds in continuously moving tubing consisting of thermoplastic plastic material sheeting. The drawing shows in diagrammatic representation in FIG. 1 in side elevation the most important driving elements and controlling elements of the welding apparatus embodying the invention and in FIG. 2 is a sectional view taken on line A-B in FIG. 1 all drive means required for the function of the apparatus according to the invention whereas the controlling elements are omitted.

Figure 2:
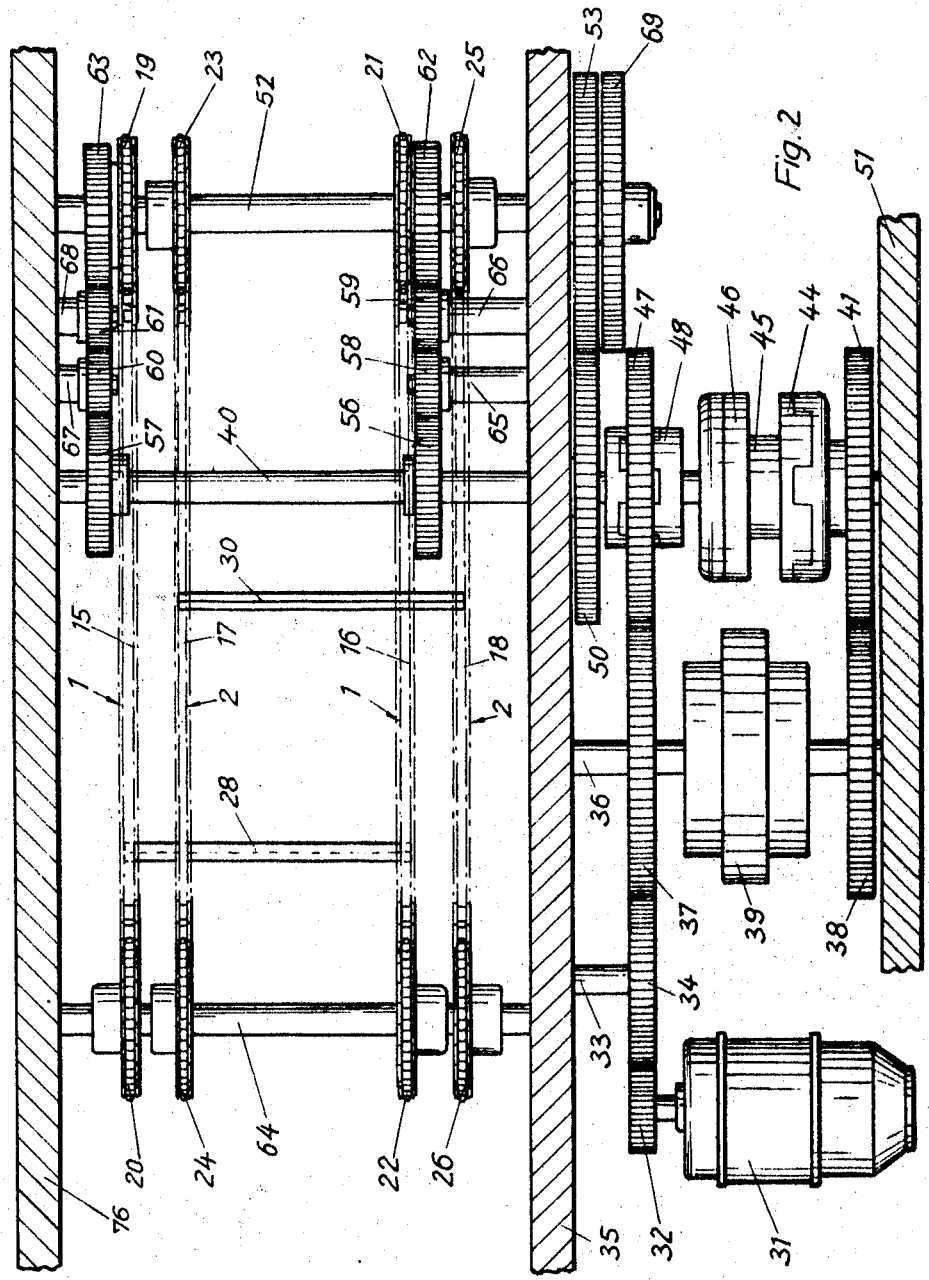
Figure 3:
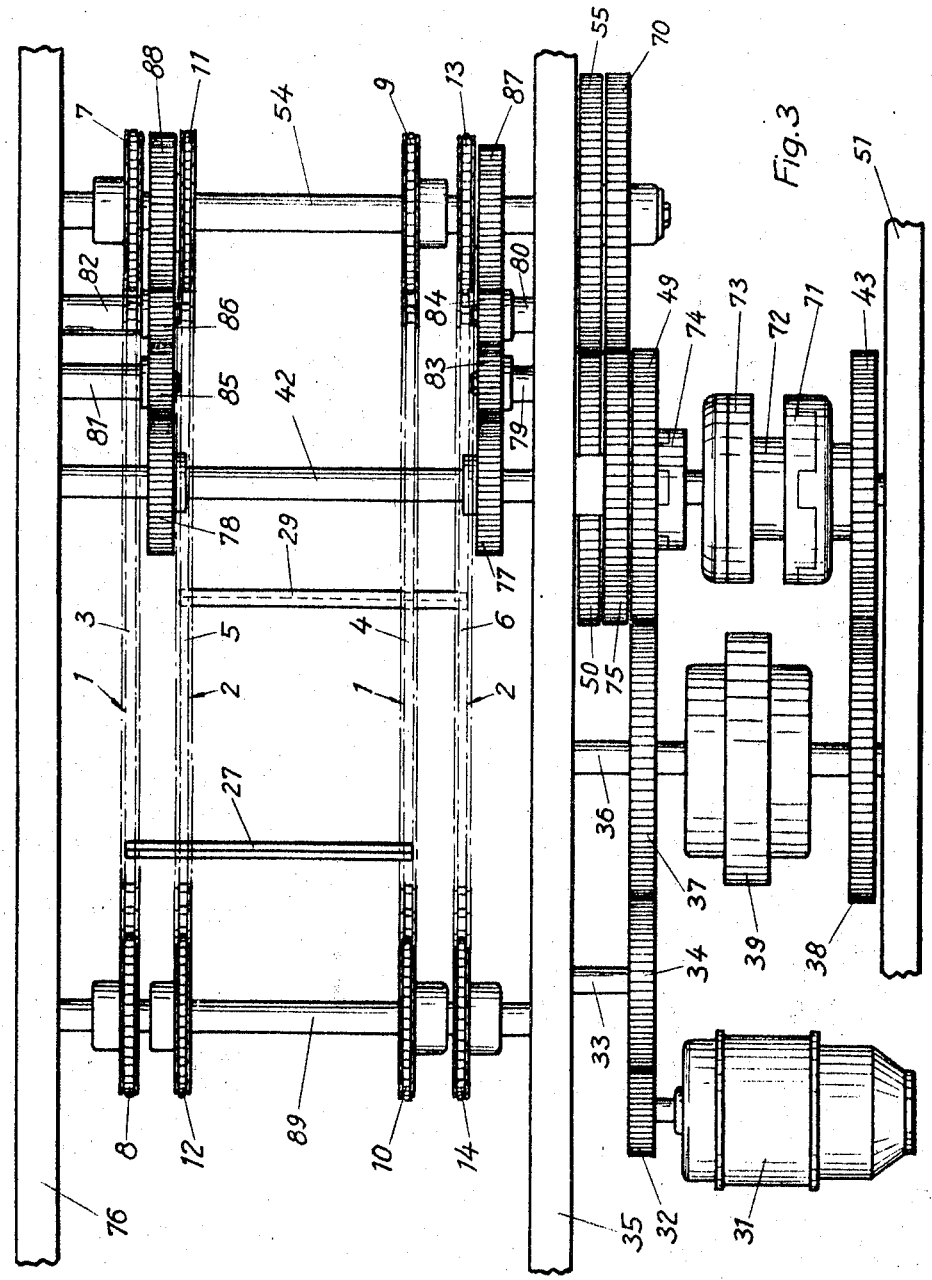

FIG. 3 shows in a top plan view the apparatus according to the invention illustrated in FIG. 1.

Each of the two welding die drive mechanisms 1 and 2, which revolve independently of each other, comprises a pair of upper chains 3, 4 and 5, 6, respectively, which are trained around sprockets 7–14, and a pair of lower chains 15, 16 and 17, 18, respectively, which are trained around sprockets 19–26. The sprockets rotate in the direction indicated by arrows in FIG. 1.

Each of the welding die drive mechanisms 1 and 2 are provided with two cooperating welding dies 27, 28 and 29, 30. In the instantaneous condition shown in the drawing, the welding dies 27 and 28 of the welding die drive mechanism 1 are revolving at a higher speed and the welding dies 29 and 30 of the welding jaw drive mechanism 2 are moving at the working speed to form seam welds on a tubing which is supplied, e.g., from a printing mechanism by way of rollers, not shown, and which is advanced in the direction of the arrow along the line A–B (FIG. 1); said seam welds are transverse to the feeding direction of the tubing.

An electric motor 31 (see particularly FIG. 2), preferably one for operating at a continuously variable speed, is provided for driving the two mutually independently revolving welding die drive mechanisms 1 and 2. By means of its drive pinion 32, this motor drives a gear 34, which is rotatably mounted on a stub shaft 33. The stub shaft 33 is non-rotatably secured in a wall 35. The gear 34 is in mesh with a gear 37, which is keyed to a shaft 36, which is rotatably mounted in the wall 35. A gear 38 is keyed to a shaft which is coaxial with the shaft 36 and rotatably mounted in the wall 51. A speed-increasing transmission 39 is interposed between the gears 37 and 38 so that the gear 38 rotates at a higher speed than the gear 37. The gear 38 is in mesh with a gear 41, which is rotatably mounted on a shaft 40 and in mesh with a gear 43 (FIG. 3), which is rotatably mounted on a shaft 42. The shafts 40 and 42 are rotatably mounted in the walls 76, 35 and 51. An electromagnetic clutch 44 is firmly connected to the gear 41 and is connected to an electromagnetic brake 46 by a connecting member 45, by which the electromagnetic clutch and the electromagnetic brake are keyed to the shaft 40. The shaft 40 carries a gear 47, which cooperates by a freewheel clutch 48 with the shaft 40 so that the drive is transmitted from the motor 31 by way of the pinion 32, the gears 34, 37 and 47 and the inner and outer rings of the freewheel 48 to the shaft 40 when the electromagnetic clutch 44 is disengaged whereas with the clutch 44 engaged the shaft 40 rotates at the speed of the gear 41, which is higher than that of the gear 47, so that the inner ring of the freewheel 48 rotates at a higher speed than its outer ring and there is no transmission of torque through the freewheel clutch in spite of the fact that the gear 47 is still driven by the gear 37. The gear 47 is also in mesh with a gear 49 (FIG. 3). A gear 50 is non-rotatably connected to the shaft 40 and in mesh with a gear 53, which is rotatably mounted on a shaft 52. The shaft 52 is rotatably mounted in the walls 35 and 76. The gear 53 is in mesh with a gear 55 (FIG. 3), which is non-rotatably mounted on a shaft 54. A gear 69 is non-rotatably mounted on the shaft 52 and in mesh with a gear 70, which is rotatably mounted on the shaft 54. Gears 56 and 37 non-rotatably secured to the shaft 40 are connected by idlers 58, 59 and 60, 61 rotatably mounted on the stub shafts 65, 66 and 67, 68, to gears 62 and 63 rotatably mounted on the shaft 52. The stub shafts 65 are non-rotatably secured in the wall 35, the stub shafts 67 and 68 are non-rotatably secured in the wall 76. The chain sprockets 21 and 19 are firmly connected to the gears 62 and 63, respectively. Two further chain sprockets 25 and 23 are non-rotatably secured to the shaft 52. The chain sprockets 20, 22, 24 and 26 are rotatably mounted on a shaft 64, which is non-rotatably secured in the walls 35 and 76. The chain sprockets 19 to 22 and the associated chains 15 and 16 form the lower part of the welding die drive mechanism 1. The sprocket wheels 23 to 26 and the chains 17 and 18 form the lower part of the welding die drive mechanism 2.

FIG. 3 shows the arrangement of the drive elements of the upper part of the two welding die drive mechanisms 1 and 2. This arrangement corresponds essentially to the arrangement of the lower part of the welding die drive mechanism. The gear 43 is rotatably mounted on the shaft 42, which is rotatably mounted in the walls 51, 35 and 76. The gear 43 is firmly connected to a second electromagnetic clutch 71, which is firmly connected to a second electromagnetic brake 73 by a connecting member 72, by which the clutch and brake are keyed to the shaft 42. The gear 49 is mounted on a freewheel 74, which has the same function as the previously described freewheel clutch 48. A gear 75 is non-rotatably mounted on the shaft 42 and in mesh with a gear 70, which is rotatably mounted on the shaft 54. The shaft 54 is rotatably mounted in the walls 35 and 76. Gears 77 and 78 are non-rotatably secured to the shaft 42 and by idler wheels 83, 84 and 85, 86 rotatably mounted on stub shafts 79, 80 and 81, 82 are connected to gears 87 and 88 rotatably mounted on the shaft 54. The stub shafts 79, 80 and 81, 82 are non-rotatably secured in the walls 35 and 76, respectively. The chain sprockets 11 and 13 are rotatably mounted on the shaft 54 and firmly connected to the gears 88 and 87, respectively. The two further chain sprockets 7 and 9 are non-rotatably secured to the shaft 54. The chain sprockets 8, 10, 12, 14 are rotatably mounted on a shaft 89, which is non-rotatably mounted in the walls 35 and 76. The chain sprockets 7 to 10 and the chains 3 and 4 associated with them form the upper part of the welding die drive mechanism 1. The chain sprockets 11 to 14 and the chains 5 and 6 form the upper part of the welding die drive mechanism 2.

The welding dies 27 to 30, which are revolved by the welding die drive mechanisms 1 and 2, are moved to the welding position e.g., by moving in a manner known per se in pairs along two upper and two lower cam tracks 90 and 91 (FIG. 1), which have such a height that the tips of the welding dies of each pair, e.g., the welding dies 29 and 30, contact each other. To determine in a simple manner the point at which the welding operation of the welding dies begins, the came tracks 90 and 91 are displaced in a longitudinal direction. This will determine the spacing of the seam weld and the width or length of the bags or sacks to be made. Each of the welding dies 27 to 30 has connected to it a roller 97, which is rotatably mounted on an axle, which is axially slidably mounted in the welding die. The rollers run on the cam tracks 90 and 91. Another roller or ball is disposed at right angles to the roller 97 and rotatably mounted on an axle, which is connected to the axially slidable axle of the roller 97. This other roller or ball moves on the inside of the cam track 90 or 91 until it runs up on a cam member, which is secured at 92 to the inside of the cam track 90 or 91. As a result, the axially displaceable axle of the roller 97 is urged into the welding die and the roller 97 is withdrawn from the cam track 90 or 91 so that the welding dies are disengaged from the cam tracks. The chains carrying these welding dies are then accelerated to move at the higher follow-up speed. The cam members provided on the inside of the cam tracks 90 and 91 are longitudinally slidable so that they can always be secured at the point 92 irrespective of a displacement of the cam track 90 or 91 for adjustment to a different width or length of the bags or sacks.

The effective length of the welding dies 27 to 30 is determined by the distance between the chains 4, 5 and 16, 17. This distance is suitably selected to equal the largest width of tubing which is usual in the manufacture of bags or sacks. The length and width of the bags or sacks depending on the selected spacing of the seam welds and on the width of the tubing, this arrangement will enable the manufacture of bags or sacks with seam welds in all lengths required in practice, without need for an adjustment of the apparatus according to the invention.

The welding dies 29 and 30 of the welding die drive mechanism 2 are shown in welding position in the drawing. These dies are driven at the working speed by the motor 31 by way of the pinion 32, the gears 34, 37, and 47, the gear 49, the freewheel 74 and the shaft 42. The gears 77 and 78 rotate in unison with the shaft 42, and this rotation is transmitted by the idlers 83, 84 and 85, 86 and the gears 87 and 88 rotatably mounted on the shaft 54 to the chain sprockets 11 and 13 of the welding die drive mechanism 2. These sprockets are also rotatably mounted and firmly connected to the gears 87 and 88. In this way, the upper chains 5 and 6 of the welding die drive mechanism 2 are driven at the working speed.

The welding die 30, which is secured to the lower chains 17 and 18 of the welding die drive mechanism 2, is also driven by the shaft 42 so that the synchronous operation of the upper and lower chain sprockets of the welding die drive mechanism 2 is ensured. The gear 75, which is firmly keyed to the shaft 42, transmits the motion of the shaft 42 by means of the gear 70, which is rotatably mounted on the shaft 54, to the gear 69, which is non-rotatably mounted on the shaft 52, and consequently to the shaft 52 itself and the chain sprockets 23 and 25 of the welding die drive mechanism 2. These chain sprockets are non-rotatably connected to the shaft 52 and drive the chains 17 and 18.

The pair of welding dies 29, 30 which travel on the tubing in unison therewith have completed the welding of a transverse seam before or when they arrive at 92 (FIG. 1). A photoelectric cell unit associated with the welding die drive mechanism 2 is arranged, e.g., at 93, and operates to scan the corresponding welding dies. When the dies 29, 30 arrive at 92, this photoelectric cell unit initiates the movement of the upper chains 5 and 6 and of the lower chains 17 and 18 of the welding die drive mechanism 2 at the higher follow-up speed. To this end, the photoelectric cells transmit an electric pulse to the electromagnetic clutch 71, which is associated with the welding jaw drive mechanism 2, to disengage said clutch. The higher speed generated by the transmission 39 can now be transmitted by the gear 38, the gear 41, which is rotatably mounted on the shaft 40, and the gear 43 directly to the shaft 42 so that the inner ring of the freewheel 74 rotates at the speed of the shaft 42 whereas the outer ring of the freewheel 74 and the gear 49 secured to it still rotate at the speed which is transmitted by the gear 37 and corresponds to the working speed of the welding dies. This outer ring of the freewheel 74 is not transmitting any torque at this stage. The increased speed is transmitted by the gears 77 and 78 non-rotatably mounted on the shaft 42 to the idlers 83 to 86 and the gears 87 and 88 to the upper chain sprockets 11 and 13 of the welding die drive 2 in the same manner as the speed corresponding to the working speed of the welding die drive mechanism was transmitted. As a result, the chains 5 and 6 and the welding jaw 29 revolve at an increased speed.

At the same time, the higher speed is imparted to the welding die 20 of the lower chains 17 and 18 from the shaft 42 by way of the gears 75, 70 and 69, the shaft 52, the chain sprockets 23 and 25 non-rotatably mounted on the shaft 52, and the chains 17 and 18 in the same manner in which the drive at the working speed was transmitted.

In the condition shown in the drawing, the welding dies 27 and 28 are revolving at the higher speed. The increased follow-up speed is imparted to these dies as follows: The electromagnetic clutch 44 has been engaged by an electric pulse transmitted by a photocell unit which is disposed at 94 (FIG. 1) and associated with the welding die drive mechanism 1. The higher speed generated by the speed-increasing transmission 39 is now transmitted from the gear 38 by the gear 41, which is firmly connected to the clutch 44, and the shaft 40 to the gears 56 and 57 non-rotatably mounted on the shaft 40. The inner ring of the freewheel 48 is now rotating with the shaft at the higher speed and relative to the outer ring, which is rotating together with the gear 47 mounted on it at the speed which corresponds tot he working speed of the welding dies. The gears 56 and 57 transmit the higher speed by the idlers 58, 59 and 60, 61 the gears 62 and 63, which are rotatably mounted on the shaft 52, the lower chain sprockets 19 and 21, which are firmly connected to these gears and also rotatably mounted on the shaft 52, to the lower chains 15 and 16 of the welding die drive mechanism 1.

The higher speed is transmitted to the upper welding die 27 also from the shaft 40 in order to ensure a synchronous revolution of the two welding jaws 27 and 28. The higher speed of the shaft 40 is transmitted by the gear 50, which is non-rotatably secured to the shaft 40, the gear 53, which is rotatably mounted on the shaft 52, the gear 55, which is non-rotatably mounted on the shaft 54, and this shaft 54 to the upper chain sprockets 7 and 9, which are firmly keyed to the shaft 54 and drive the chains 3 and 4 of the welding die drive mechanism 1.

One of the photoelectric cell units 95 and 96, which are mounted on the cam tracks 90 and 91, changes the speed of the welding dies 97 from the higher speed to the working speed before these dies run up on that portion of the cam tracks which is closer to the tubing. The photoelectric cell transmits an electric pulse to the electromagnetic brake 46 to operate the same. The electromagnetic clutch 44 is disengaged at the same time. The braking time of the electromagnetic brake 46 is set, e.g., by a time limit relay, so that the brake is automatically released as soon as the shaft 40 has assumed the speed which corresponds to the working speed of the welding dies. This speed is directly transmitted from the motor 31 by way of the pinion 32, the gears 34 and 37, the gear 47 and the freewheel 48 to the shaft 40. As has been described hereinbefore, the speed of the shaft 40 determines the speed of the chains 15 and 16, which are now moving again at the working speed.

As has also been described, the shaft 40 determines also the working speed of the upper welding jaw 27.

The change from the higher follow-up speed of the welding dies 29 and 30 to the working speed is effected in the manner which has been described hereinbefore for the welding dies 27 and 28 of the welding die drive mechanism 1. In this case the pulse is transmitted by the photoelectric cell to the electromagnetic brake 72, which is associated with the welding die drive mechanism 2. The electromagnetic clutch 71 is disengaged at the same time. An example of a circuit capable of disengaging a clutch and, at the same time, operating a brake can be found in U. S. Patent No. 1,993,413.

To enable an adjustment of the desired spacing of the seam welds, the photoelectric cells 95 and 96 are longitudinally slidably and adjustably mounted so that the time at which the change from the higher speed to the working speed is effected can be adjusted. During the processing of previously printed sheeting, the photoelectric cells 95 and 96 do not scan the welding dies associated with them but the print or printed marks on the sheeting web. As each photoelectric cell is associated with one welding die drive mechanism, they must give a response in alternation and for this purpose are alternatingly rendered operative and inoperative by a separate contact disc, which is driven in synchronism with the machine.

The working cycles of the two welding jaw drives 1 and 2, which revolve independently of each other, are so matched that at any time one pair of welding dies are revolving at the working speed and welding whereas the other pair of welding dies revolve at a higher speed and subsequently assume the working speed and begin to weld as soon as the welding operation of the first pair of welding dies has been terminated and the latter assume the higher speed.

The invention is not restricted to the embodiment which has been described hereinbefore and shown on the drawing by way of example. The principle of the solution suggested by the invention, to use two conveyor elements, which revolve independently of each other and alternatingly at two different speeds, may be applied to numerous other processing and handling tools. For instance, the delivery apparatus for the bags or sacks which have been made with the welding apparatus just described could also embody the principle of the solution suggested by the invention. In this case, the apparatus just described is succeeded by the lower part of the two drive mechanisms 1 and 2 whereas the upper part of the two welding die drives 1 and 2 is succeeded by a conveyor belt which revolves continuously on the same level at the speed of the web, and the welding dies are replaced by a backing element, which revolves at the speed of the tubing during the conveyance and urges a completed bag or sack against this conveyor belt so that the bag or sack moves in unison with the conveyor belt to a delivery station, whereas another backing element revolves according to the invention at a higher speed until it has reached the desired spacing from the above-mentioned backing element. Then the second backing element assumes the speed of the tubing, grips the next bag or sack and moves it also to a delivery station. The conveyor elements may carry, e.g., perforating devices or the like rather than welding dies. The invention may also be applied to printing machines for a simple adjustment of the spacing of prints on webs. To this end, each of the upper conveyor chains is provided with a printing block and the lower chains may be replaced by an impression roll.

I claim:

1. Apparatus for a stoppage-free processing of webs in adjustable processing stations or for a stoppage-free processing or handling of workpieces, fed in variable lengths or with a variable spacing, the apparatus comprising processing or handling tools, secured to revolving endless conveyor chain-like elements, and moving during the processing or handling operation at the speed of the web or workpieces, the improvement comprising at least two conveyor elements arranged parallel to each other, drive means driving said elements at different speeds and means for controlling said drive means, said drive means changing the speeds during each revolution, each conveyor element carrying a tool, and said drive means driving said conveyor elements so that they revolve at an increased follow-up speed after completing the processing or handling operation performed by the respective tool secured thereto and are retarded to the speed of the web or workpieces when the tool has the desired spacing from the tool of the respective other conveyor element.

2. Apparatus according to claim 1, wherein the drive means includes a drive motor, conveyor element drive wheels and a drive linkage between the drive motor and the drive wheels of co-operating conveyor elements, said drive linkage being branched and the two branches having different transmission ratios and being adapted to be selectively coupled to the drive wheels.

3. Apparatus according to claim 2, wherein the drive means further includes a freewheel clutch for coupling the slower transmission branch and an externally controlled clutch for coupling the faster transmission branch to the drive wheels, selectively.

4. Apparatus according to claim 3, wherein the externally controlled clutch comprises an electromagnetic clutch, and the apparatus further including electromagnetic brakes acting on the drive wheels to selectively brake the same.

References Cited

UNITED STATES PATENTS

| | | | |
|---|---|---|---|
| 2,602,562 | 7/1952 | Bresciani | 250—223 X |
| 2,171,130 | 8/1939 | Merrifield | 250—215 X |
| 2,645,396 | 7/1953 | Spohr | 226—24 X |
| 3,155,221 | 11/1964 | Griner | 250—223 X |
| 3,162,294 | 12/1964 | Dieter | 250—223 X |
| 3,215,810 | 11/1965 | Lange et al. | 219—79 |
| 3,238,374 | 3/1966 | Pfister. | |

WALTER STOLWEIN, Primary Examiner

U.S. Cl. X.R.

219—79